(12) United States Patent
Matsuzaki

(10) Patent No.: US 9,942,445 B2
(45) Date of Patent: Apr. 10, 2018

(54) IMAGE PROCESSING APPARATUS AND IMAGE PROCESSING METHOD

(71) Applicant: CANON KABUSHIKI KAISHA, Tokyo (JP)

(72) Inventor: Masanori Matsuzaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 59 days.

(21) Appl. No.: 15/232,046

(22) Filed: Aug. 9, 2016

(65) Prior Publication Data

US 2017/0054876 A1 Feb. 23, 2017

(30) Foreign Application Priority Data

Aug. 19, 2015 (JP) .................. 2015-161992

(51) Int. Cl.
*H04N 1/60* (2006.01)
*H04N 1/00* (2006.01)

(52) U.S. Cl.
CPC ....... *H04N 1/6008* (2013.01); *H04N 1/00005* (2013.01); *H04N 1/00023* (2013.01); *H04N 1/00037* (2013.01); *H04N 1/00045* (2013.01); *H04N 1/00068* (2013.01); *H04N 1/00082* (2013.01); *H04N 2201/0094* (2013.01)

(58) Field of Classification Search
CPC .......... H04N 1/00005; H04N 1/00023; H04N 1/6008; H04N 1/00037; H04N 1/00045; H04N 1/00068; H04N 1/00082; H04N 1/0094
See application file for complete search history.

(56) References Cited

FOREIGN PATENT DOCUMENTS

JP 2011-137895 A 7/2011

*Primary Examiner* — Christopher D Wait
(74) *Attorney, Agent, or Firm* — Canon USA Inc., IP Division

(57) ABSTRACT

An image processing apparatus includes an acquisition unit that acquires, from image data acquired in such a manner that a chart formed by an image forming unit is read, a line signal value from pixel values of pixels for a line arranged in a first direction of the chart and a line representative value by using line signal values respectively acquired from a plurality of lines adjacent to each other in a second direction different from the first direction of the chart, and a determination unit that determines a portion where a streak is generated in the second direction by using a difference between a first representative value and a second representative value.

11 Claims, 12 Drawing Sheets

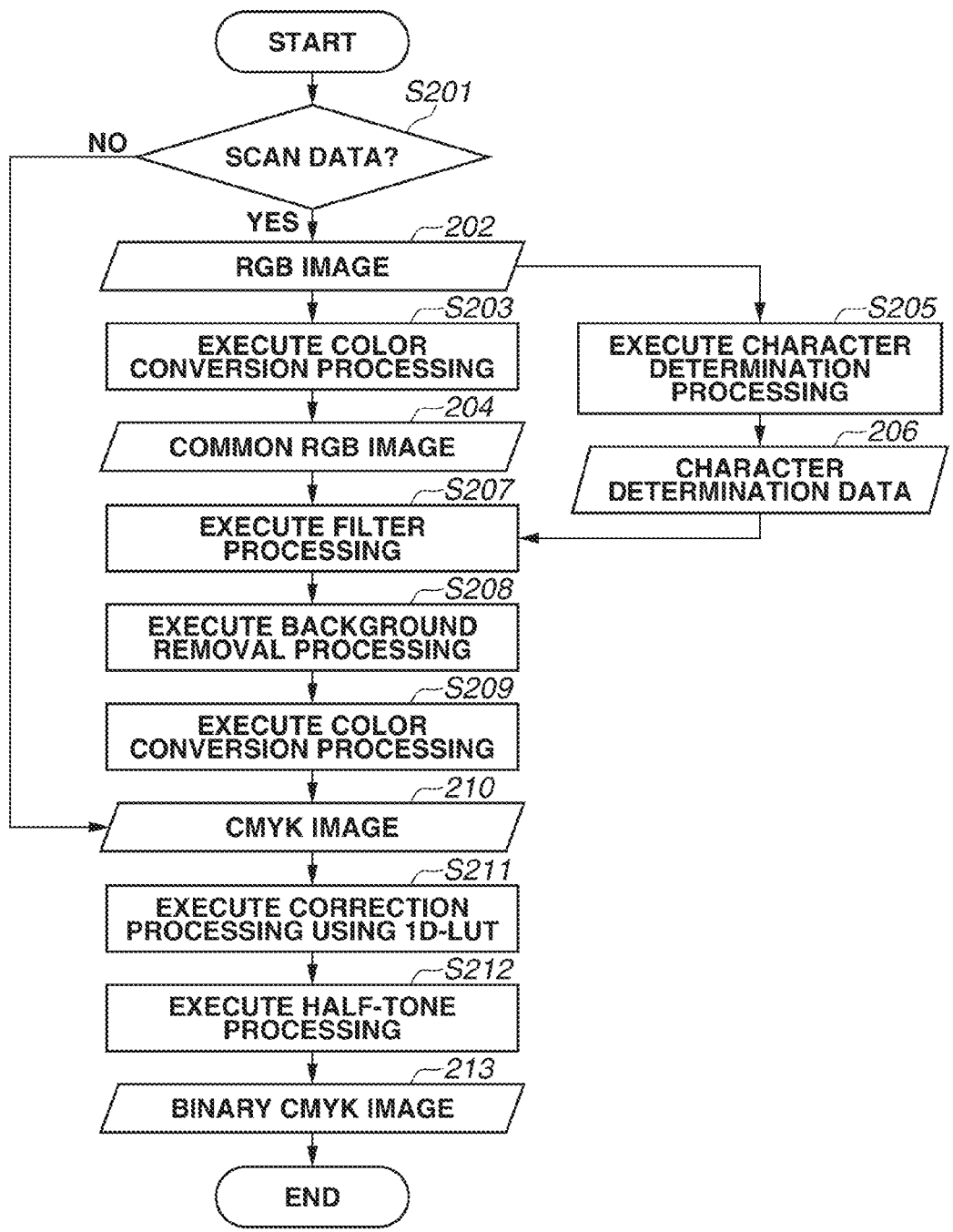

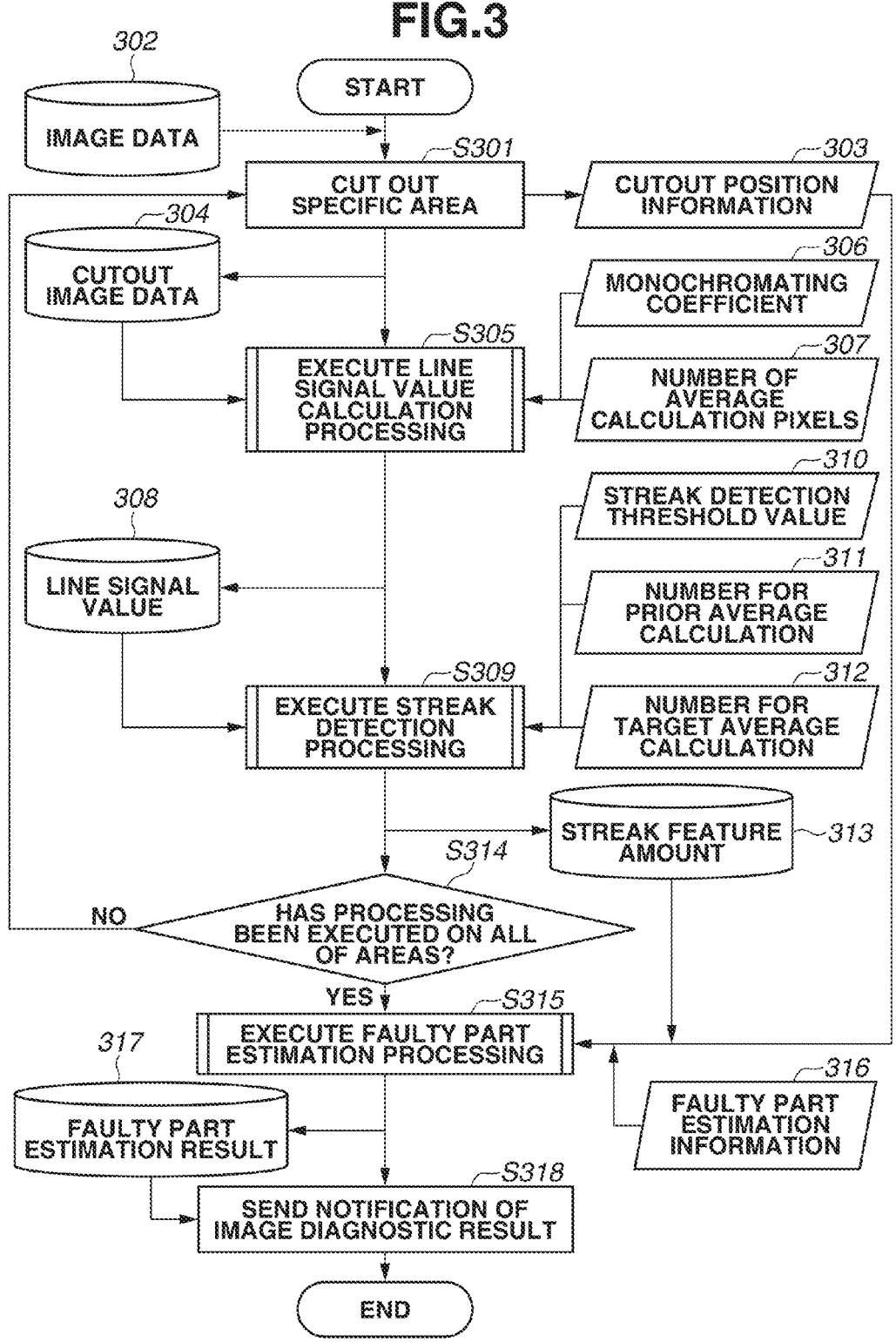

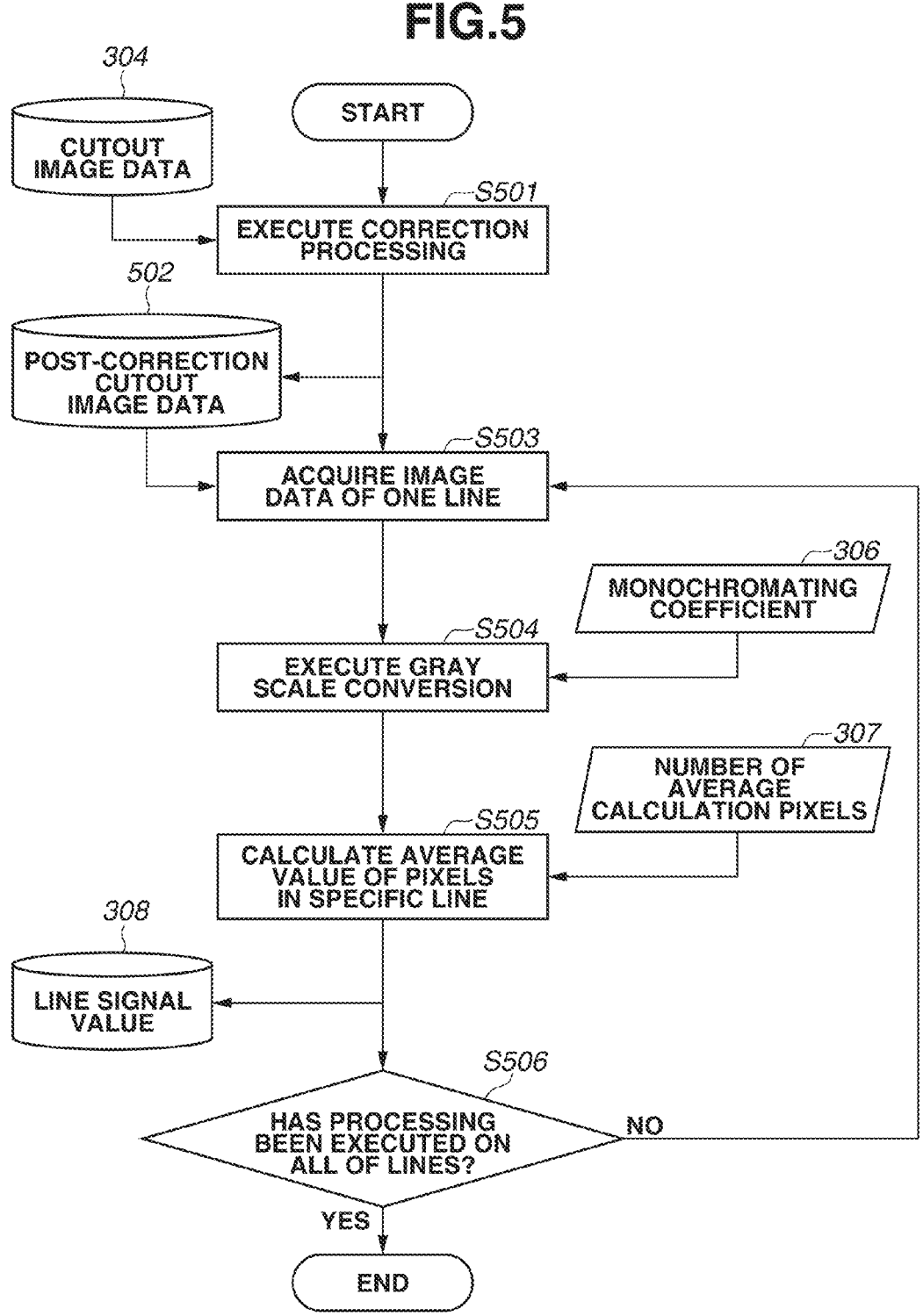

FIG.10

IMAGE DIAGNOSIS

DIAGNOSTIC RESULT: PROBLEM HAS OCCURRED IN IMAGE QUALITY.

THERE IS A POSSIBILITY OF MALFUNCTION IN XXX.

CODE: X X X X

OK

IMAGE PROCESSING APPARATUS AND IMAGE PROCESSING METHOD

BACKGROUND

Field

Aspects of the present invention generally relate to an image processing apparatus and an image processing method for analyzing presence or absence of abnormalities in a printer and estimating a faulty part, and a program for executing image processing.

Description of the Related Art

In recent years, with the improvement in performance of electro-photographic apparatuses, apparatuses (i.e., image processing apparatuses, such as printers) that realize image quality equivalent to that of printing machines have appeared. When a printer is to be operated in a same manner as a printing machine, it is necessary to maintain high level of image quality. However, the printer may be degraded if the printer is used for a long time under stressful operational conditions, and thus an unusual image (abnormal image) may be output therefrom. A streak generated in a sub-scanning direction or a main scanning direction of the printer can be given as an example of a problem arising at high frequency.

Because such an abnormal image arising due to deterioration and the like is difficult to be detected automatically using sensors, it is often the case that the servicing operation is performed after a user has pointed out such abnormalities. However, it is difficult for the user to verbally explain features of the abnormal image. Therefore, for example, even if a service engineer is informed about a streak generated in an output image, cause of the streak cannot be identified unless the service engineer is provided with detailed information, such as a color, a direction, a position, and a width of the generated streak. Therefore, when the user points out that the abnormal image is output, the service engineer has to visit the installation site to check how the output abnormal image look like. Then, the service engineer estimates a faulty portion by checking the abnormal image, identifies related service parts, returns to the service base once to obtain the service parts, and visits the installation site again to perform a servicing operation. If the servicing operation is performed in such a manner, this can cause not only transportation cost of the service engineer to increase, but also downtime to occur because the apparatus cannot be used until the servicing operation is completed, and thus productivity of the user will be lowered remarkably.

Therefore, Japanese Patent Application Laid-Open No. 2011-137895 discusses a technique in which whether a printer is in failure is diagnosed by determining presence or absence of streaks (white spots) through threshold processing executed on divided regions of a scan image of an image output from the printer.

However, the streaks with low density as well as high density can be generated in the image output from the printer. In addition, the streaks are generated in various widths (thicknesses) depending on the cause of failure. Further, in-plane deviation which cannot be identified visually, which is specific to an electro-photographic printer, is generated.

Further, similar to the case of the printer, a scanner has a characteristic in which specific in-plane deviation can be generated in a scan image acquired from read data. Furthermore, the scanner also has such a characteristic that variation caused by the influence of noise occurs in a scan image even if uniform data is read thereby.

As described above, even if the image appears to be uniform when seen by the human eyes, signal values of the scan image vary considerably because of the characteristic of the scanner, and thus it is difficult to detect streaks having different widths or densities using the threshold value.

Because of the above-described reasons, with the conventional technique, it is difficult to determine presence or absence of streaks in an image output by the electro-photographic printer using a scanner.

SUMMARY

According to an aspect of the present invention, an image processing apparatus includes an acquisition unit configured to acquire, from image data acquired in such a manner that a chart formed by an image forming unit is read, a line signal value from pixel values of pixels for a line arranged in a first direction of the chart and a line representative value by using line signal values respectively acquired from a plurality of lines adjacent to each other in a second direction different from the first direction of the chart, and a determination unit configured to determine whether a streak is generated in a first position by using a difference between a first representative value and a second representative value, the first representative value being acquired by the acquisition unit at a second position that is read prior to the first position in the second direction and the second representative value being acquired by the acquisition unit at a third position that is read posterior to the first position in the second direction, wherein the second position is a position where the determination unit does not determine that a streak is generated.

According to aspects of the present invention, it is possible to detect presence or absence of streaks as well as positions or widths of the streaks while influence of in-plane deviation of a printer and influence of in-plane deviation/noise of a scanner are suppressed.

Further features of aspects of the present invention will become apparent from the following description of exemplary embodiments with reference to the attached drawings.

BRIEF DESCRIPTION OF THE DRAWINGS

FIG. 2 is a flowchart illustrating a flow of image processing.

FIG. 3 is a flowchart illustrating a flow of image diagnosis processing according to a first exemplary embodiment.

FIG. 5 is a flowchart illustrating a flow of line signal value calculation processing according to the first exemplary embodiment.

FIG. 10 is a diagram illustrating a notification example of an image diagnostic result according to the first exemplary embodiment.

DESCRIPTION OF THE EMBODIMENTS

An exemplary embodiment implementing the present invention will be described with reference to the appended drawings.

In a first exemplary embodiment, description will be given to a method in which a faulty part is estimated from a detection result by executing streak detection and calculating a line signal value from a scan image when image diagnosis is executed.

Figure 1:
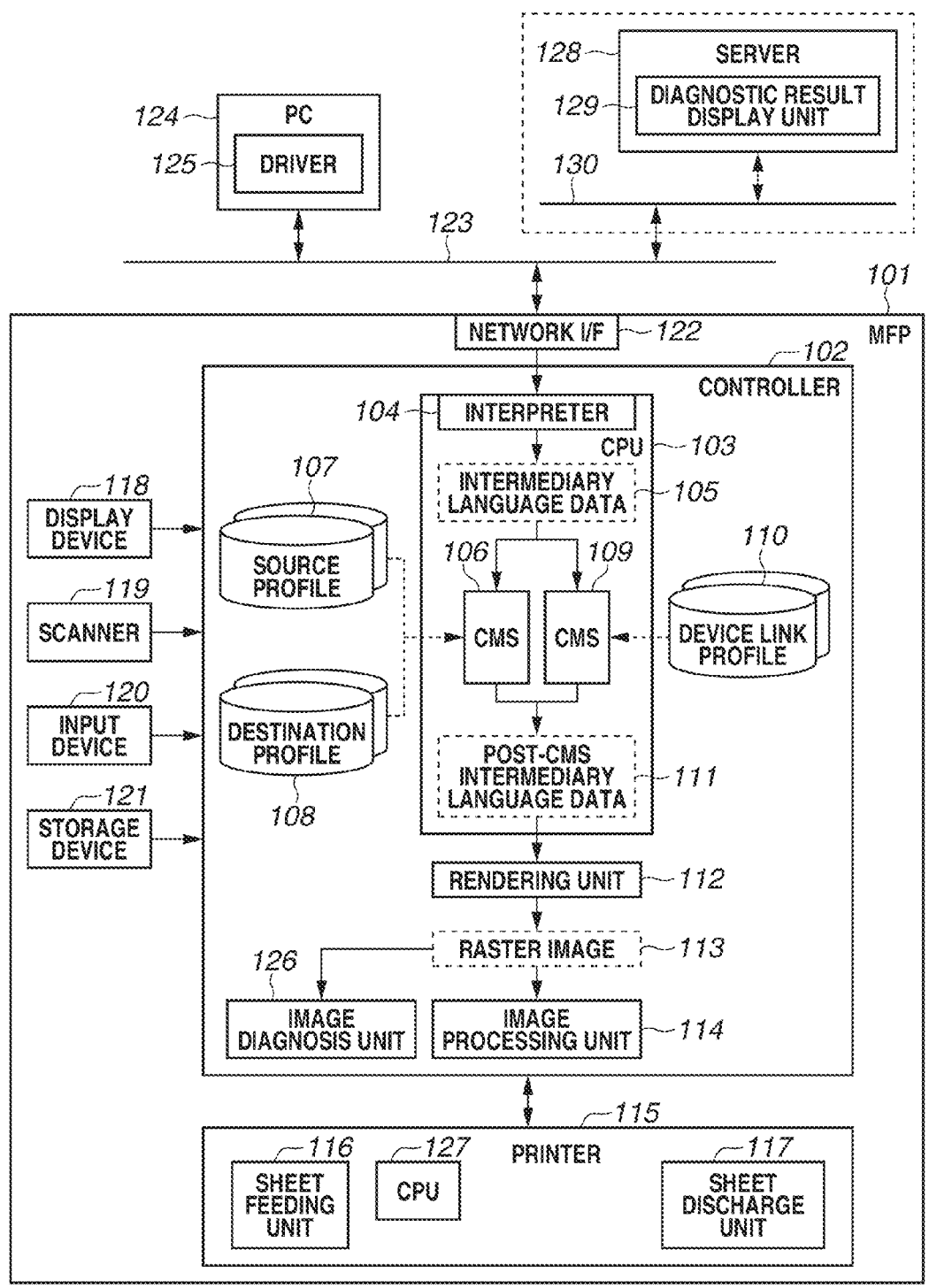
FIG. 1 is a block diagram illustrating a system configuration.

FIG. 1 is a diagram illustrating a configuration of a system according to the present exemplary embodiment. A multi-function peripheral (MFP) 101 that uses toners of cyan, magenta, yellow, and black (hereinafter, referred to as "C", "M", "Y", and "K") is connected to network-compatible devices via a network 123. Further, a personal computer (PC) 124 is connected to the MFP 101 via the network 123. A printer driver 125 in the PC 124 transmits print data to the MFP 101.

The MFP 101 will be described in detail. A network interface (I/F) 122 receives data, such as print data. A controller 102 includes a central processing unit (CPU) 103, a rendering unit 112, and an image processing unit 114. An interpreter 104 of the CPU 103 interprets page description language (PDL) included in the received print data and generates intermediary language data 105.

Then, a color management system (CMS) 106 executes color conversion using a source profile 107 and a destination profile 108 to generate post-CMS intermediary language data 111. The CMS 106 executes color conversion using the profile information described below. The source profile 107 is used when a device-dependent color space, such as an RGB color space or a CMYK color space, is converted into a device-independent color space, such as the L*a*b* (hereinafter, referred to as "Lab") color space or the XYZ color space defined by the International Commission on Illumination (CIE). Both of the XYZ color space and the Lab color space are device-independent color spaces in which colors are expressed in tri-stimulus values. Further, the destination profile 108 is used for conversion of a device-independent color space to a CMYK color space that depends on a device, such as a printer 115.

On the other hand, a CMS 109 executes color conversion using a device link profile 110 to generate the post-CMS intermediary language data 111. Herein, the device link profile 110 is used for conversion of the device-dependent color space, such as the RGB color space or the CMYK color space, to the CMYK color space that depends on a device, such as the printer 115. Determination of which CMS is selected depends on the setting of the printer driver 125.

In the present exemplary embodiment, the CMSs 106 and 109 are separately used according to the types of profiles 107, 108, and 110. Alternatively, a single CMS can handle the profiles of a plurality of types. Further, a type of profile is not limited to those described in the present exemplary embodiment, and a profile can be any type as long as the device-dependent CMYK color space of the printer 115 is used.

The rendering unit 112 generates a raster image 113 from the generated post-CMS intermediary language data 111. The image processing unit 114 executes image processing on the raster image 113 and an image read by a scanner 119. The image processing unit 114 will be described below in detail.

The printer 115 that is connected to the controller 102 outputs and forms data on a sheet using the toner in colors of C, M, Y, and K. The printer 115 is controlled by the CPU 127, and includes a sheet feeding unit 116 for feeding a sheet and a sheet discharge unit 117 for discharging a sheet on which output data is formed.

A display device 118 serves as a user interface (UI) for displaying an instruction to a user and a state of the MFP 101. The display device 118 is used in the below-described image diagnosis processing in addition to copying or transmission processing.

The scanner 119 includes an automatic document feeder. The scanner 119 irradiates a bundle or a sheet of document with light emitted from a light source (not illustrated), so that a reflected document image is formed on a solid-state image sensor, such as a charge coupled device (CCD) sensor, through a lens. Then, the scanner 119 acquires a rasterized image reading signal from the solid-state image sensor as image data.

An input device 120 is an interface for receiving an input from a user. A part of the input device 120 serves as a touch panel and the input device 120 is integrated with the display device 118.

A storage device 121 stores data processed or received by the controller 102.

When an output image is an abnormal image, an image diagnosis unit 126 executes image diagnosis processing by executing streak detection and faulty part estimation processing using the raster image 113 which is obtained by scanning an output chart. The above processing will be described below in detail.

A server 128 is connected to the MFP 101 via a network 130. The network 130 is connected to the network 123 and is provided in a remote environment, for example, in a different building. In the present exemplary embodiment, although the server 128 is only connected to the MFP 101, the server 128 can manage the information of a plurality of MFPs. A diagnostic result display unit 129 receives, for example, an estimation result of faulty parts from the image diagnosis unit 126 and displays the result to a service engineer.

Next, a flow of processing executed by the image processing unit 114 will be described with reference to FIG. 2. FIG. 2 is a flowchart illustrating image processing that is executed to the raster image 113 or the image read by the scanner 119. The processing flow illustrated in FIG. 2 is executed and realized by an application specific integrated circuit (ASIC) (not illustrated) included in the image processing unit 114.

In step S201, the image processing unit 114 determines whether received image data is scan data read by the scanner 119 or the raster image 113 transmitted from the printer driver 125.

If the received data is not the scan data (NO in step S201), the data is determined to be the raster image 113 which is rasterized into a bitmap format by the rendering unit 112, so that the subsequent processing will be executed in a manner such that the image data is treated as a CMYK image 210, the color space of which has been converted into the printer device-dependent CMYK by the CMS 106 (109).

If the received image data is the scan data (YES in step S201), the image data is determined to be an RGB image 202, so that the processing proceeds to step S203. In step S203, the image processing unit 114 executes color conversion processing and generates a common RGB image 204. The common RGB image 204 is defined by a device-independent RGB color space, and can be converted into a device-independent color space, such as the Lab color space, through an operation.

Further, in step S205, the image processing unit 114 executes character determination processing and generates character determination data 206. In the present exemplary embodiment, the image processing unit 114 detects the edge of the image to generate the character determination data 206.

Next, in step S207, the image processing unit 114 executes filter processing on the common RGB image 204 using the character determination data 206. In the present exemplary embodiment, the filter processing for the character portion using the character determination data 206 is a different type of filter processing which is executed to the portion other than the characters. Then, in step S208, the image processing unit 114 executes background removal processing and eliminates the background color component.

Next, in step S209, the image processing unit 114 executes color conversion processing and generates the CMYK image 210. Then, in step S211, the image processing unit 114 corrects the gradation characteristics of each of the colors of C, M, Y, and K using a 1D-LUT. The 1D-LUT refers to a one-dimensional look up table for correcting the respective colors of C, M, Y, and K.

Finally, in step S212, the image processing unit 114 executes image forming processing, such as screen processing and error diffusion processing, and generates a binary CMYK image 213.

Next, the image diagnosis processing according to the present exemplary embodiment will be described with reference to FIG. 3. The image diagnosis processing is executed by a user of the MFP 101 and controlled by the image diagnosis unit 126 when an abnormal image is output. In the below-described processing flow, processing in steps S301 to S318 is executed and realized by the CPU 103 within the controller 102, and the acquired data is stored in the storage device 121. Further, an instruction to the user is displayed on the UI by the display device 118, and an instruction from the user is received by the input device 120.

First, in step S301, the CPU 103 reads image data (RGB) 302, generates cutout image data 304 by cutting out an area as a streak detection target, and stores cutout position information 303 that indicates position information of the area cut out from the image data 302. The area to be cut out from the read image data 302 is data having a rectangular shape parallel to the sheet on which the scanned image data is printed. In the present exemplary embodiment, the image data 302 is the raster image 113 acquired in such a manner that a chart stored in the storage device 121 is processed by the image processing unit 114, printed by the printer 115, and read by the scanner 119.

Figure 4A:
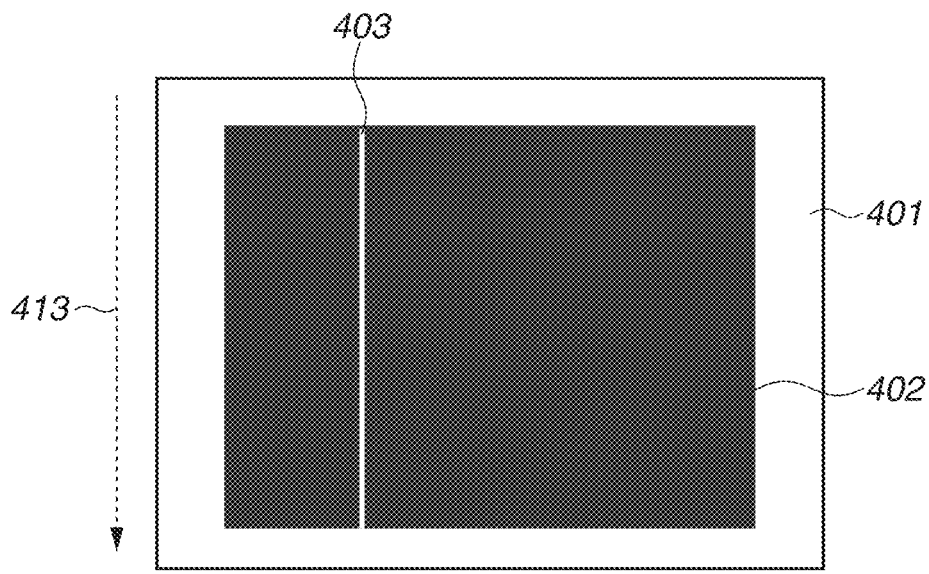
FIGS. 4A and 4B are diagrams each illustrating an example of a chart for streak detection according to the first exemplary embodiment.
Figure 4B:
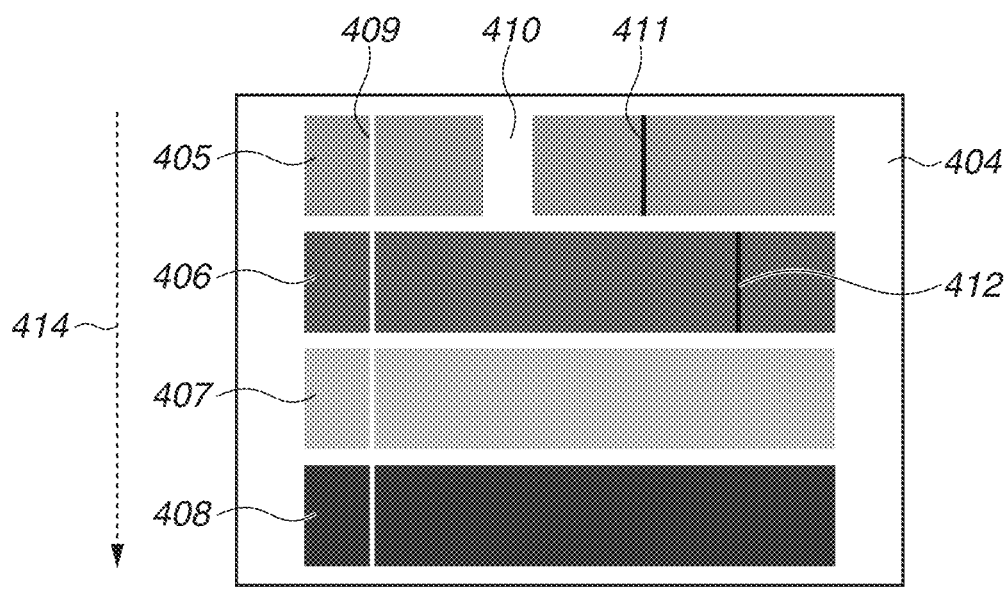

Examples of the charts are illustrated in FIGS. 4A and 4B. FIG. 4A is a diagram illustrating a chart which is used for detecting a streak generated in any one of the color components of C, M, Y, and K. An area 402 on a sheet 401 is formed by a monochrome toner with uniform density. The area 402 can be data in any density. A streak 403 is an abnormal image generated due to the malfunction of a specific part, such as a development part, a transfer part, or a fixing part. Most of the streaks generated in the electrophotographic printer are generated in a sub-scanning direction or a main scanning direction. A conveyance direction or a sub-scanning direction 413 of a sheet is indicated by a dashed arrow. The streak 403 is generated in the sub-scanning direction 413.

FIG. 4B is a diagram illustrating a chart which is used for collectively detecting the streaks generated in respective color components of C, M, Y, and K.

Areas 405, 406, 407, and 408 are respectively formed on a sheet 404 using a C-toner, a M-toner, a Y-toner, and a K-toner with uniform density.

A streak 409 is a streak with low density, which is generated in all of the color components of C, M, Y, and K.

A streak 410 is a streak having a wide width with low density, which is generated only in the area 405 formed by using the C-toner.

A streak 411 is a streak with high density, which is generated only in the area 405 formed by using the C-toner.

A streak 412 is a streak with high density, which is generated only in the area 406 formed by using the M-toner.

A sheet conveyance direction is a sub-scanning direction 414 which is indicated by a dashed arrow. The streaks 409 to 412 are the streaks generated in the sub-scanning direction 414. The chart illustrated in FIG. 4B is a chart used for detecting the streaks generated in the sub-scanning direction. In order for detecting streaks generated in the main scanning direction, a chart which is obtained in such a manner that the chart illustrated in FIG. 4B is rotated by 90-degree and output can be used.

Hereinafter, the chart in FIG. 4B is used for explaining the processing flow illustrated in FIG. 3. In step S301, the CPU 103 executes cutout processing on the image area formed using any of the toners of C, M, Y, and K. In the present exemplary embodiment, the cutout processing is executed in such a manner that a difference between signal values of a printing region and signal values of a sheet is acquired and four corners of the image area are specified. Alternatively, any other method can be employed for the cutout processing of the image area.

Next, in step S305, the CPU 103 calculates a line signal value 308 using a monochromating coefficient 306 and a number of average calculation pixels 307.

Processing for calculating the line signal value 308 will be described with reference to FIG. 5.

Each process of processing steps in FIG. 5 are executed and realized by the CPU 103 in the controller 102, and acquired data is stored in the storage device 121.

First, in step S501, the CPU 103 executes correction processing on the RGB cutout image data 304 cut out from the RGB image data to generate a post-correction cutout image data 502. In the present exemplary embodiment, the gamma characteristic of the scanner is corrected so that easily detectable signal values are corrected. Alternatively, any method can be employed for the correction processing.

Figure 8A:
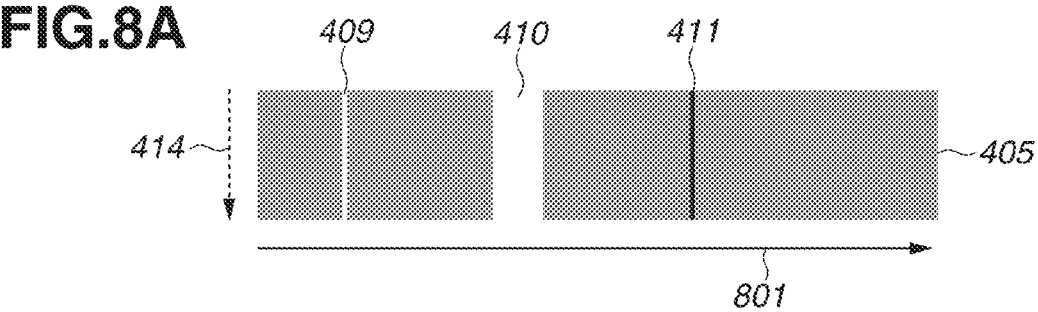
FIGS. 8A, 8B, and 8C are a diagram and graphs illustrating examples of a line signal value and average value difference data according to the first exemplary embodiment.

Next, in step S503, the CPU 103 acquires image data of one line. An example thereof is illustrated in FIG. 8A. FIG. 8A illustrates the area 405 cut out from the chart in FIG. 4B. The streak is generated in parallel with the sub-scanning direction 414. Pixel values of the pixels in a line parallel to the sub-scanning direction 414 in which the streak is generated are acquired with respect to a main scanning direction 801.

Next, in step S504, the CPU 103 executes gray scale conversion on the cutout image data 502 consisting of RGB components using the monochromating coefficient 306.

Herein, a different monochromating coefficient 306 is used for each of the areas (colors). Although, in the present exemplary embodiment, the monochromating coefficient 306 is a coefficient for adding the signal values of the RGB components at a certain ratio, the monochromating coefficient 306 can be a coefficient for extracting data of any of the RGB components.

Next, in step S505, the CPU 103 extracts the pixels in a read specific line, calculates an average value of a plurality of extracted pixels using the number of average calculation pixels 307, and stores the average value as a line signal value 308. The number of average calculation pixels 307 is a number of pixels from which the pixel values are to be extracted, and indicates how many pixels are extracted and averaged. This value is determined previously, and the value thereof can be the number of pixels in one line in the sub-scanning direction or a certain value that depends on a sheet size.

The stored line signal value is not limited to the average value of a plurality of pixels. Alternatively, any value corresponding to "a representative value" that represents pixel values of a plurality of pixels in a line, such as "an intermediary value of the maximum value and the minimum value" or "a frequently-acquired value", can be stored as the line signal value.

Finally, in step S506, the CPU 103 determines whether the processing is executed on all of the lines. If there are any unprocessed lines (NO in step S506), the processing returns to step S503 and the subsequent steps are executed repeatedly.

Through the above processing, in a case where a streak is generated in a direction vertical to the main scanning direction (i.e., a direction parallel to the sub-scanning direction), an average value of pixel values of the pixels constituting the line is acquired as a line signal value at each position in the main scanning direction.

Because the processing is executed with respect to every position from one end to another end in the main scanning direction, a line signal value corresponding to each position in the main scanning direction can be acquired.

Figure 8B:
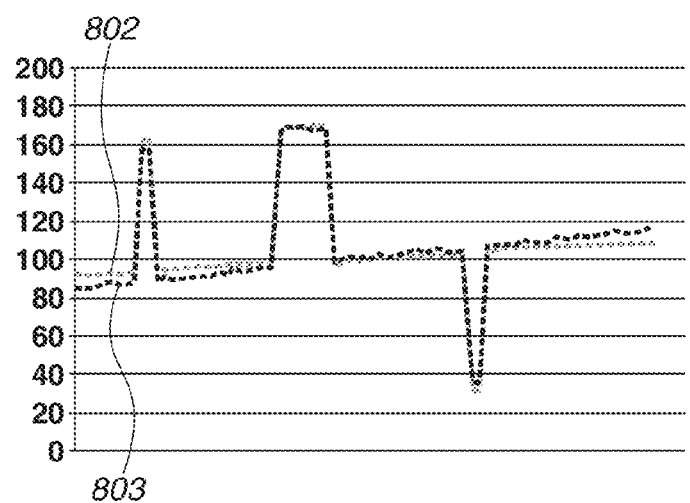

FIG. 8B is a graph illustrating an example of the line signal values. A line signal value 803 is a line signal value of the area 405.

A horizontal axis of the graph illustrated in FIG. 8B represents a position in the main scanning direction 801, whereas a vertical axis of the graph represents a calculated average value (line signal value).

The average value is greater in a portion where a streak with low density, for example, portions of the streaks 409 and 410, is generated, whereas the average value is smaller in a portion where a streak with high density, for example, a portion of the streak 411, is generated. A signal value 802 is acquired under the assumption that deviation or noise caused by the scanner is not at all generated. The signal value 802 indicates a state where only a streak or deviation caused by the printer is generated.

The line signal value 803 indicates the case of when there is influence of deviation and noise caused by the scanner. It is therefore more difficult to detect the streak by using the threshold value.

After the line signal value calculation processing is executed in step S305 of the flowchart in FIG. 3, in step S309, the CPU 103 executes streak detection processing on the line signal value 308 and outputs a streak feature amount 313. In this process, a streak detection threshold value 310, a number for prior average calculation 311, and a number for target average calculation 312 which are determined previously are used.

Figure 6:
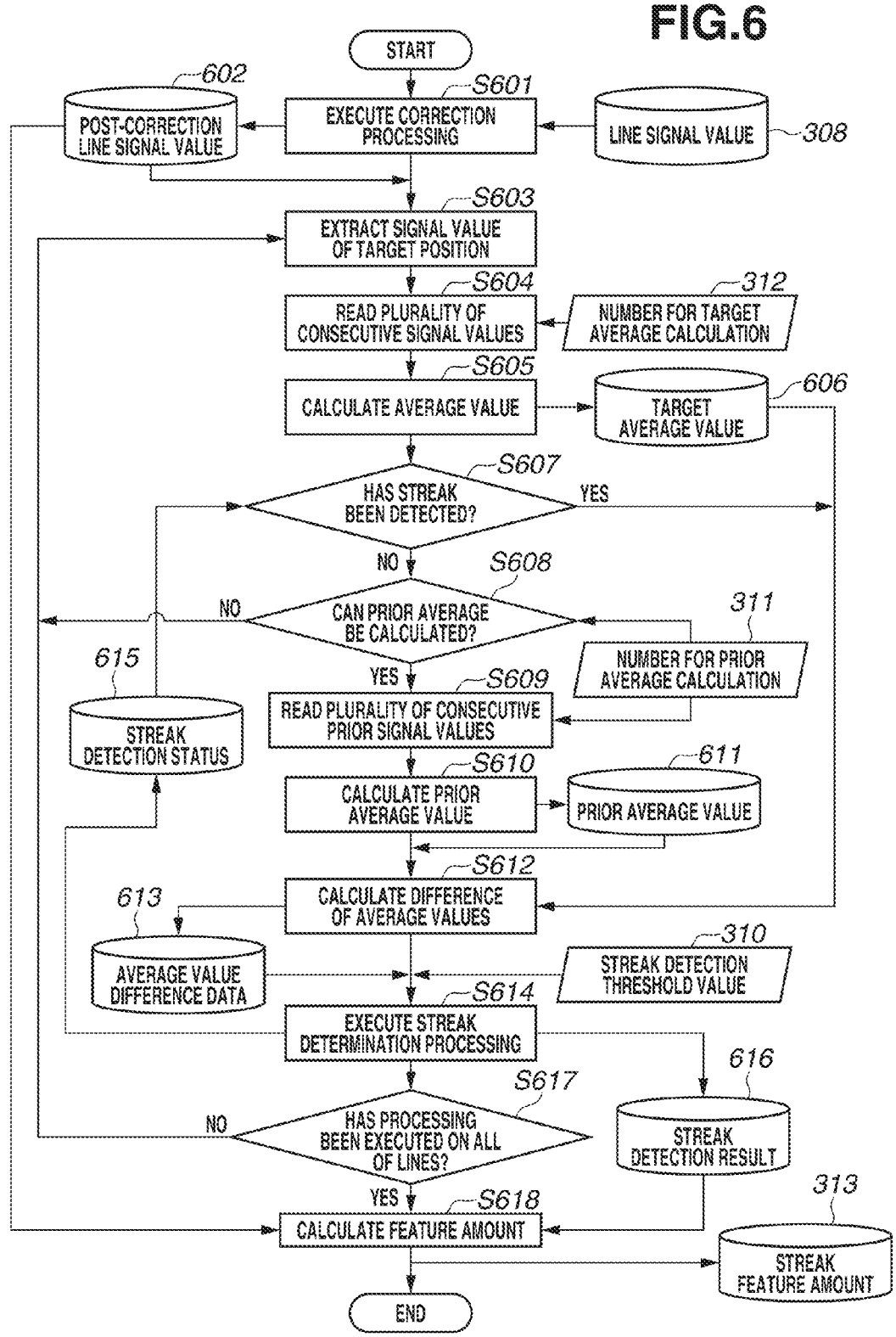
FIG. 6 is a flowchart illustrating a flow of streak detection processing according to the first exemplary embodiment.

The streak detection processing will be described in detail with reference to FIG. 6. Respective processing steps in FIG. 6 are executed and realized by the CPU 103 in the controller 102, and acquired data is stored in the storage device 121.

First, in step S601, the CPU 103 executes correction processing by reading the line signal value 308 and calculates a post-correction line signal value 602. In this correction processing, noise is eliminated using, for example, a moving average. Any method other than the noise elimination can be performed as the correction processing.

Next, in step S603, from among the post-correction line signal values 602 acquired in correspondence with respective positions in the main scanning direction, the CPU 103 extracts a line signal value acquired in correspondence with a target position (first position) that is an optional position in the main scanning direction.

Next, in step S604, the CPU 103 reads the line signal values respectively corresponding to positions consecutively arranged in the main scanning direction by using the number for target average calculation 312.

The number for target average calculation 312 is a value that indicates line signal values of how many pixels respectively corresponding to consecutive positions in the main scanning direction are to be read.

Figure 9A:
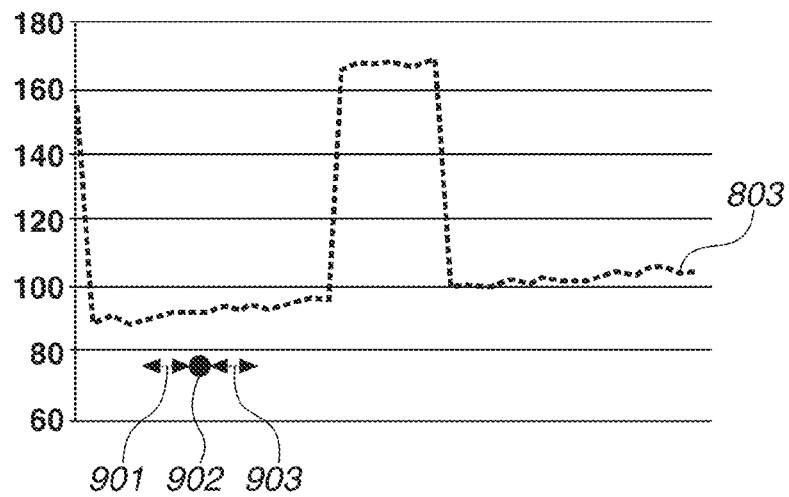
FIGS. 9A, 9B, and 9C are graphs each illustrating an example of processing for calculating a prior average value and a target average value according to the first exemplary embodiment.

In step S605, the CPU 103 outputs an average value of the read plurality of line signal values as a target average value 606. An example thereof is illustrated in FIG. 9A. A horizontal axis of a graph in FIG. 9A represents a position in the main scanning direction. A vertical axis of the graph represents a calculated line signal value. In FIG. 9A, a black dot represents a target position 902 in the main scanning direction. A target average value 903 is an average value of a plurality of consecutive signal values of a position within a predetermined range corresponding to a position posterior to the target position 902 in the main scanning direction, and is an average value of respective line signal values corresponding to the position of the target average value 903. The target average value 606 can be an average value of the line signal values corresponding the position within any range as long as the position is posterior to the target position 902 in the main scanning direction (i.e., position to be scanned posterior to the target position 902).

Therefore, the target average value 606 can be the average value of the line signal values corresponding to the position away from the target position 902.

In a case where an average value of line signal values corresponding to a position away from the target position 902 is acquired, a streak with moderate variation can be detected easily. On the other hand, in a case where an average value of line signal values corresponding to a position close to the target position 902 is acquired, the streak can be detected without influence of the in-plane deviation of the printer and influence of the in-plane deviation/noise of the scanner.

Further, the target average value 606 is not limited to an average value of a plurality of line signal values. Alternatively, any value corresponding to "a representative value" which represents a plurality of signal values, such as "an intermediary value of the maximum and the minimum values" or "a frequently-acquired value" of a plurality of acquired line signal values corresponding to the position in the main scanning direction, can be used. Values can be discretely acquired within a range posterior to the target position 902.

Next, in step S607, the CPU 103 refers to a streak detection status 615 to determine whether the streak is detected at the target position. The streak has not been detected at the time of starting the processing.

In step S607, if it is determined that the streak is not detected at the target position (NO in step S607), the processing proceeds to step S608. In step S608, the CPU 103 reads the number for prior average calculation 311 to determine whether a prior average value can be calculated. The prior average is an average value of a plurality of consecutive signal values of a position within a predetermined range corresponding to a position prior to the target position 902 (i.e., position to be scanned prior to the target position 902).

Further, the number for prior average calculation 311 is a value that indicates line signal values of how many pixels respectively corresponding to the consecutive positions in the main scanning direction are to be read.

For example, if a starting portion of the scanning in the scanning direction is assigned as the target position, pixel values of a position prior to the target position do not exist. Thus, in such a case, the prior average cannot be calculated. In a case where the prior average cannot be calculated, the target position is changed and the processing in step S603 and the subsequent steps will be repeated.

In step S608, if it is determined that the prior average can be calculated (YES in step S608), the processing proceeds to step S609. In step S609, the CPU 103 reads consecutive signal values of a position prior to the target position by using the number for prior average calculation 311. Next, in step S610, the CPU 103 calculates a prior average value 611. An example thereof is illustrated in FIG. 9A. A black dot in FIG. 9A represents the target position 902. A prior average value 901 is an average value of a plurality of consecutive signal values of a position corresponding to a position prior to the target position 902 in the main scanning direction, and is an average value of line signal values each corresponding to the position of the prior average value 901. The prior average value 611 can be an average value of line signal values of a position within any range as long as the position is prior to the target position 902 in the main scanning direction. Therefore, the prior average value 611 can be an average value of line signal values corresponding to a position away from the target position 902.

Further, the prior average value 611 is not limited to the average value of a plurality of line signal values. Alternately, any value corresponding to "a representative value" which represents a plurality of signal values, such as "an intermediary value of the maximum and the minimum values" or "a frequently-acquired value" of a plurality of acquired line signal values corresponding to a position in the main scanning direction, can be used. The line signal values can be discretely acquired within a range prior to the target position 902.

Next, in step S612, the CPU 103 calculates a difference between the target average value 606 and the prior average value 611, and outputs the difference as average value difference data 613.

Next, in step S614, the CPU 103 executes streak determination processing using the average value difference data 613 and the streak detection threshold value 310, and outputs the processing result as a streak detection result 616. If the average value difference data 613 exceeds the threshold value, the CPU 103 determines that the streak is detected and reflects the determination result on the streak detection status 615. If the average value difference data 613 is equal to or less the threshold value, the CPU 103 determines that the streak is not detected and reflects the determination result on the streak detection status 615.

Next, in step S617, the CPU 103 determines whether the processing has been executed on all of the lines. If the processing has not been executed on all of the lines (NO in step S617), the target position is changed and the processing in step S603 and the subsequent steps is executed repeatedly. If the processing has been executed on all of the lines (YES in step S617), the processing is ended.

In addition, in step S607, if the CPU 103 refers to the streak detection status 615 and determines that the streak is detected (YES in step S607), the prior average value 611 is not calculated from the target position. Then, in step S612, the CPU 103 executes difference calculation processing using the prior average value 611 for the streak detection.

The reason of the determination of whether the prior average value 611 is or is not calculated according to the result of the streak detection determination in step S607 will be described with reference to FIGS. 9A to 9C.

FIG. 9A is a graph illustrating a state where the streak is not detected at the target position 902. With respect to the target position 902, a target average value 903 and a prior average value 901 are calculated, and a difference between the target average value 903 and the prior average value 901 is acquired. Because a streak is not generated at the positions prior to and posterior to the target position 902, a small value equal to or less than a threshold value is acquired as the difference.

Figure 9B:
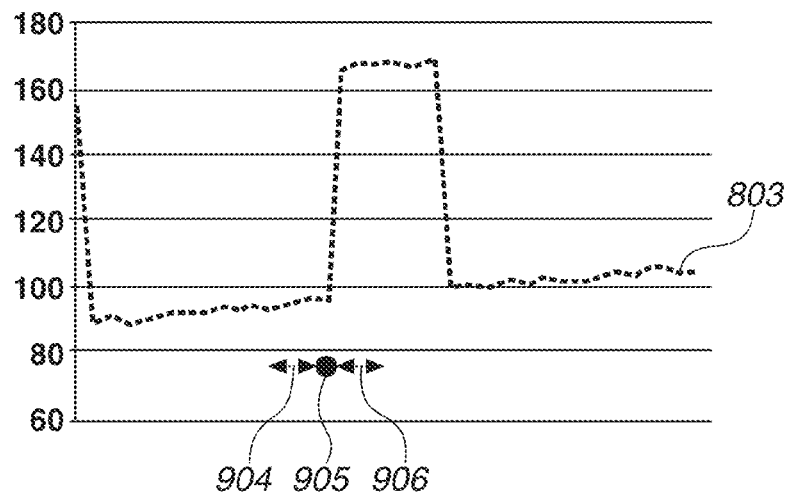

FIG. 9B is a graph also illustrating a state where the streak is not detected at a target position 905. With respect to the target position 905, a target average value 906 and a prior average value 904 are calculated, and a difference between the target average value 906 and the prior average value 904 is acquired. Because a streak is generated at a position posterior to the target position 905, a large value that exceeds the threshold value is acquired as the difference. Therefore, it is determined that the streak is detected at the position posterior to the target position 905.

Figure 9C:
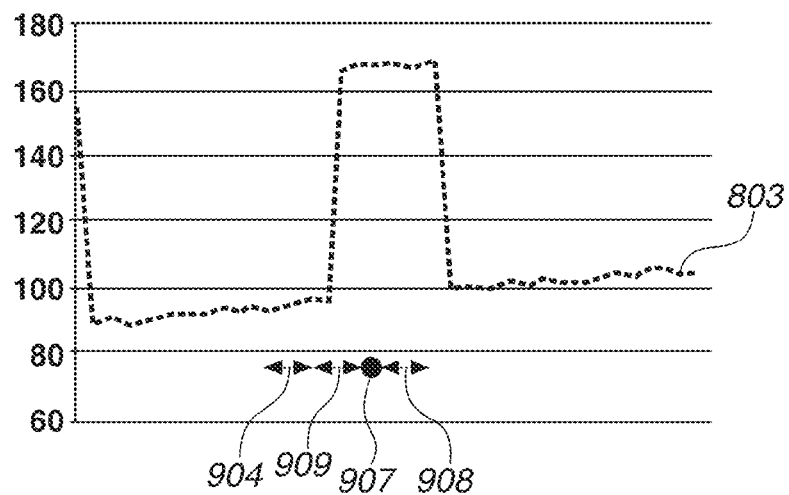

FIG. 9C is a graph illustrating a state where the streak is detected at a target position 907. With respect to the target position 907, a target average value 908 is calculated. The prior average value 904 acquired from a range prior to the position where the streak is detected is calculated instead of a prior average value 909 acquired from the range posterior to the position where the streak is detected, and a difference between the target average value 908 and the prior average value 904 is acquired. Because the streak is continuously generated at the position posterior to the target position 907, a large value that exceeds the threshold value is acquired as the difference.

If a position where the streak is not generated is assigned as the target position, a difference between the target average value and the prior average value 904 becomes smaller. In this case, the CPU 103 determines that the streak is not generated, and thus the position posterior to the target position is determined to be the position where the streak is not detected, and subsequent processing is repeated accordingly.

As described above, because the prior average value used for calculating the difference is switched depending on whether the streak is detected (i.e., the prior average value acquired from the range prior to the position where the streak is detected is used with respect to the region posterior to the position where the streak is detected), it is possible to precisely detect a width of the streak.

Figure 8C:
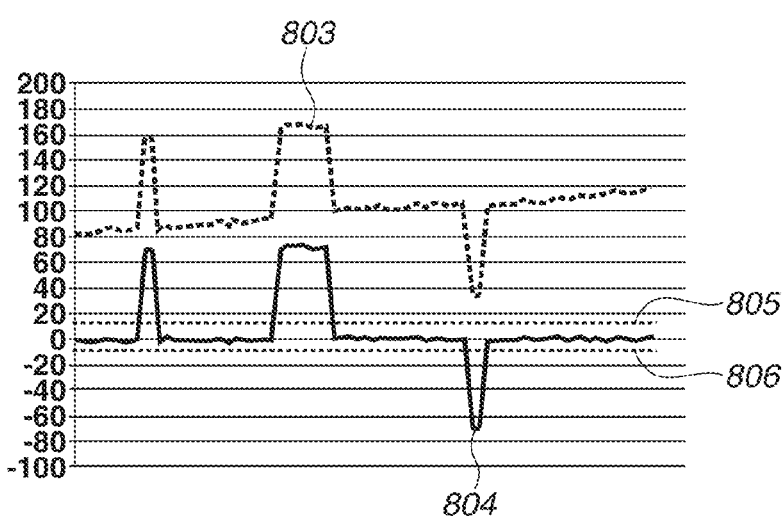

A signal value 804 of FIG. 8C represents the average value difference data 613. A difference value is close to zero in a portion where the streak is not generated and considerably departed from zero in a portion where the streak is generated. A thin streak has a positive value, whereas a thick streak has a negative value. Each of an upper limit threshold value 805 and a lower limit threshold value 806 is the streak detection threshold value 310. A difference greater than the upper limit threshold value 805 is determined to be a thin streak, and a difference smaller than the lower limit threshold value 806 is determined to be a thick streak.

Predetermined values or values different in accordance with respective colors of C, M, Y, and K can be assigned as the upper limit threshold value 805 and the lower limit threshold value 806.

In the flowchart of FIG. 6, in step S618, the streak feature amount 313 is calculated by using the post-correction line signal value 602 and the streak detection result 616. A position, a width, a density, a signal value, and the like of the streak are calculated as the feature amounts.

After executing the processing in step S309 of the flowchart in FIG. 3, in step S314, the CPU 103 determines whether the processing is executed with respect to all of the areas (in case of FIG. 4B, areas 405 to 408) of the image data 302. If it is determined that the processing has not been executed (NO in step S314), the processing returns to step S301. In step S301, cutout processing of the unprocessed area is executed, and the subsequent processing steps are executed repeatedly.

If it is determined that the processing has been executed with respect to all of the areas (YES in step S314), the processing proceeds to step S315. In step S315, the CPU 103 executes faulty part estimation processing using the cutout position information 303, the streak feature amount 313, and faulty part estimation information 316, and outputs a faulty part estimation result 317.

Figure 7:
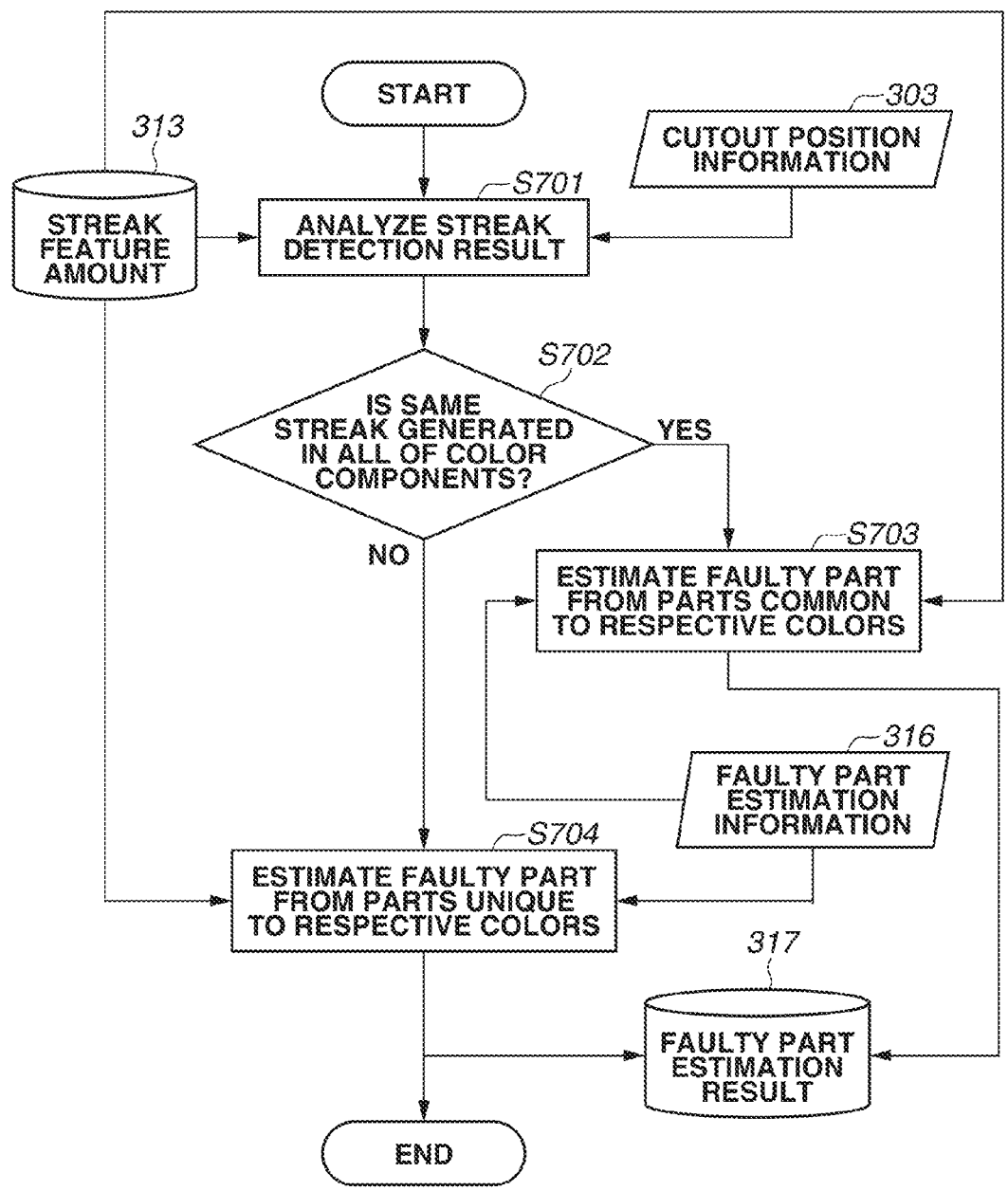
FIG. 7 is a flowchart illustrating a flow of faulty part estimation processing according to the first exemplary embodiment.

The faulty part estimation processing will be described with reference to FIG. 7. First, in step S701, the CPU 103 reads the streak feature amount 313 and the cutout position information 303 and analyzes the streak detection result. The CPU 103 refers to a width, a position, and a density of the streak detected in each area and determines whether the streak having the same feature is generated in a plurality of areas. The CPU 103 uses cutout position information 303 in order to calculate a precise position by eliminating the influence of deviation between color plates in a printing period.

Next, in step S702, the CPU 103 determines whether the same streak is generated in all of the color plates. If it is determined that the same streak is generated in all of the color plates (YES in step S702), the processing proceeds to step S703. In step S703, the CPU 103 estimates the faulty part from the streak feature amount 313 and the faulty part estimation information 316. Parts of the printer 115 and feature amounts of a faulty period are associated and stored as the faulty part estimation information 316. In step S703, the CPU 103 refers to a color-independent part, such as a fixing unit and a transfer drum (i.e., a part commonly used for image formation using the toner of each colors) to estimate a faulty part and outputs an estimation result as the faulty part estimation result 317.

In step S702, if it is determined that the same streak is not generated in all of the color plates (NO in step S702), the processing proceeds to step S704. In step S704, the CPU 103 estimates a faulty part from the streak feature amount 313 and the faulty part estimation information 316 for each color. The CPU 103 estimates the faulty part by referring to a color-dependent part, such as a development unit, from the faulty part estimation information 316, and outputs an estimation result as the faulty part estimation result 317.

If the chart does not consist of the separate color plates as illustrated in FIG. 4A, only the faulty part estimation processing is executed with respect to the corresponding color plate without executing the determination processing in step S702.

Finally, in step S318 of the flowchart in FIG. 3, the CPU 103 uses the faulty part estimation result 317 to send a notification of an image diagnostic result. An example thereof is illustrated in FIG. 10. A UI 1001 is an example of the image diagnostic result displayed on the display device 118. A part assumed to be a faulty part and a code corresponding the part are displayed as the image diagnostic result. A user can notify a service engineer of the diagnostic result or the code, so that the service engineer can determine presence or absence of failure and take measures in advance without visiting the installation site. If the networks 123 and 127 are enabled, the image diagnostic result is displayed on the diagnostic result display unit 129 of the server 128, so that the service engineer can make a determination without being notified by the user. Any information other than the information described in the present exemplary embodiment, such as detailed information about the streak, can be displayed on the UI 1001.

In the present exemplary embodiment, a predetermined streak detection threshold value has been used. Alternatively, a threshold value that can be used in place of the streak detection threshold value can be calculated from line signal values by scanning the data which does not have streaks. Further, in the present exemplary embodiment, a faulty part has been estimated through the processing steps illustrated in the flowchart of FIG. 7. However, for example, the estimation processing using learning data, such as the Bayesian estimation method, can be executed. Further, in the present exemplary embodiment, although the image diagnosis processing is executed by the image diagnosis unit 126 of the MFP 101, all or a part of the processing can be executed by the server 128.

According to the present exemplary embodiment, it is possible to detect presence or absence of the streak as well as the position and the width of the streak without influence of in-plane deviation which is a printer-specific feature amount and influence of in-plane deviation/noise which is a scanner-specific feature amount. Further, because the streak is detected for each of the colors of C, M, Y, and K, a faulty portion can be estimated more specifically.

In a second exemplary embodiment, description will be given to an exemplary embodiment for determining whether a detection result acquired from streak detection is valid.

In the method described in the first exemplary embodiment, a specific area is cut out from image data, and a line signal value is calculated. A faulty part is then estimated by executing the streak detection processing.

However, if a streak is generated at an initial position of the target position at the time of streak detection, a portion where the streak is not generated is erroneously determined as a portion where the streak is generated. Although it is possible to determine whether the processing is executed correctly by checking the signal value, it will be difficult to make a determination when a difference between the signal values of a normal portion and a streak portion is small.

In consideration of the above condition, in the present exemplary embodiment, description will be given to an exemplary embodiment in which whether a result of the streak detection processing is valid is determined after the streak detection processing.

A flow of processing from the streak detection to the faulty part estimation is similar to the processing flow described in the first exemplary embodiment, and thus description thereof will be omitted. In the present exemplary embodiment, the streak detection processing executed in step S309 is different from that described in the first exemplary embodiment.

The streak detection processing will be described with reference to the flowchart in FIG. 11.

Figure 11:
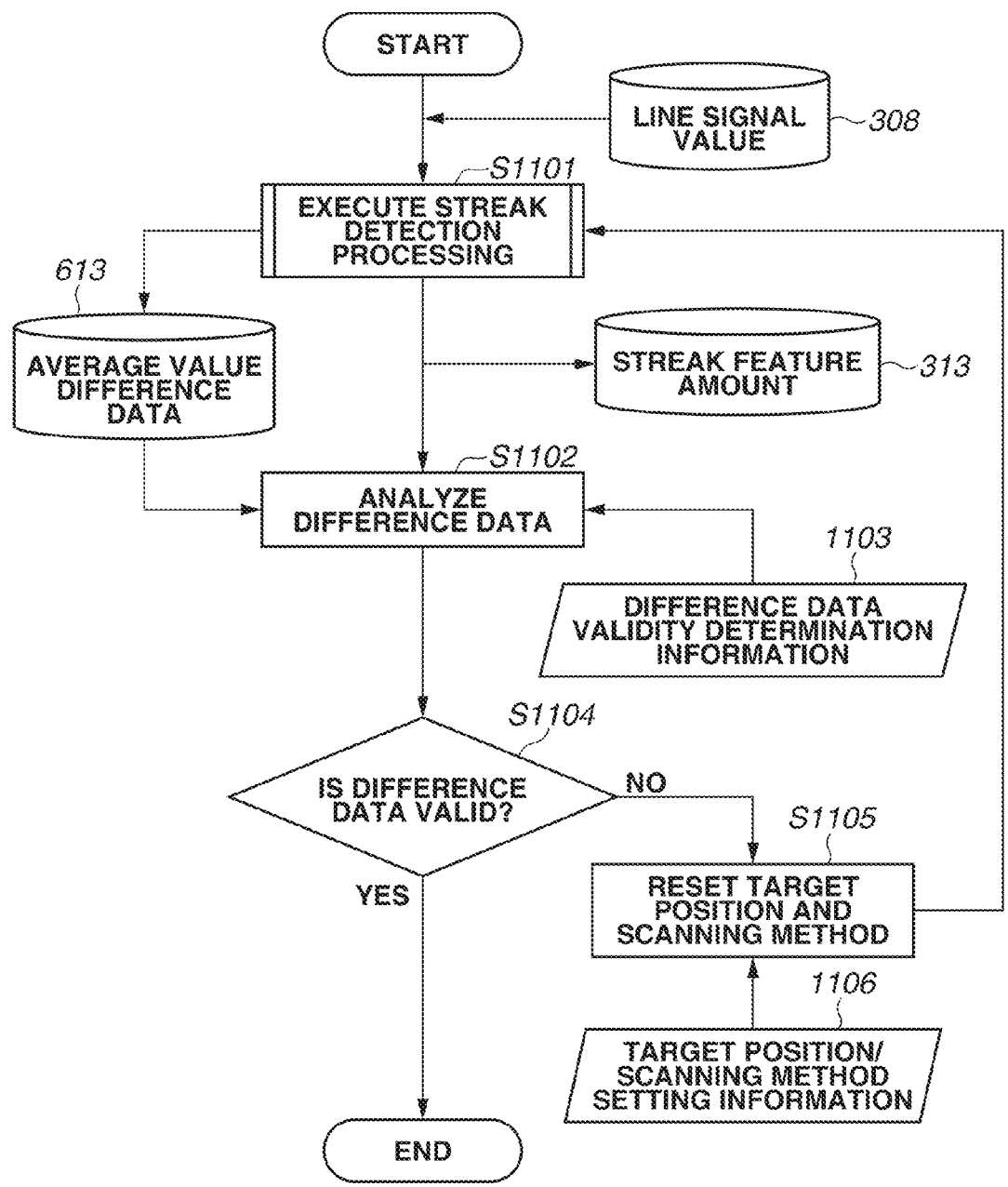
FIG. 11 is a flowchart illustrating a flow of streak detection processing according to a second exemplary embodiment.

Respective processing steps in FIG. 11 are executed and realized by the CPU 103 in the controller 102, and acquired data is stored in the storage device 121.

First, in step S1101, the CPU 103 reads the line signal value 308, executes streak detection processing, and outputs the average value difference data 613 and the streak feature amount 313. The streak detection processing is similar to the processing executed in steps S601 to S618, and thus description thereof will be omitted.

Next, in step S1102, the CPU 103 analyzes the average value difference data 613 using difference data validity determination information 1103, and in step S1104, the CPU 103 determines whether the average value difference data 613 is valid difference data. After the determination in step S1104, if the average value difference data 613 is determined to be valid (YES in step S1104), the processing is ended. If the average value difference data 613 is determined to be invalid (NO in step S1104), the processing proceeds to step S1105. In step S1105, the CPU 103 uses target position/scanning method setting information 1106 to execute setting again and repeats the streak detection processing in step S1101. Because it takes time to repeat the streak detection processing in step S1101, a notification about recalculation can be displayed on the display device 118.

Figure 12A:
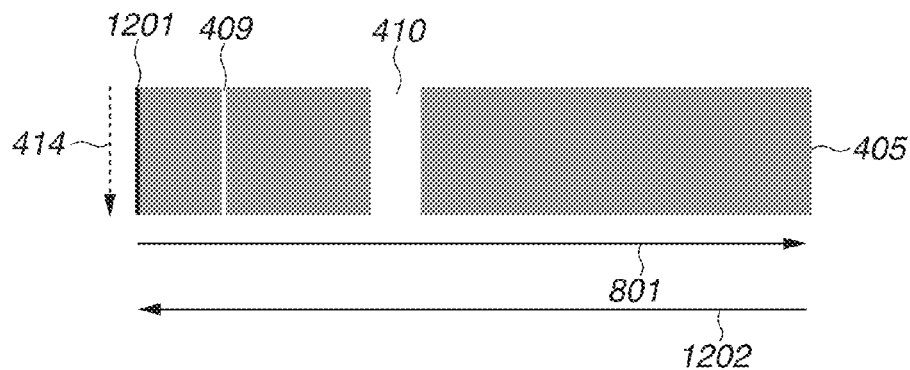
FIGS. 12A, 12B, and 12C are a diagram and graphs illustrating examples of a line signal value and average value difference data according to the second exemplary embodiment.
Figure 12B:
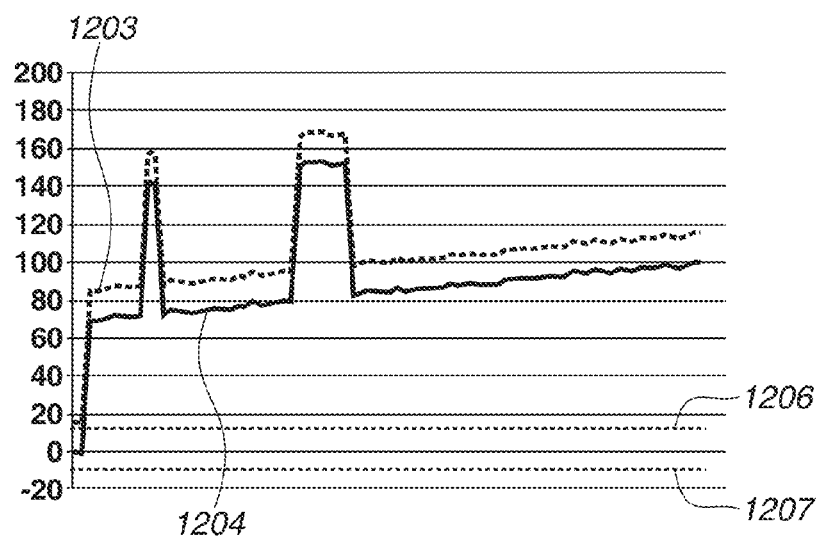
Figure 12C:
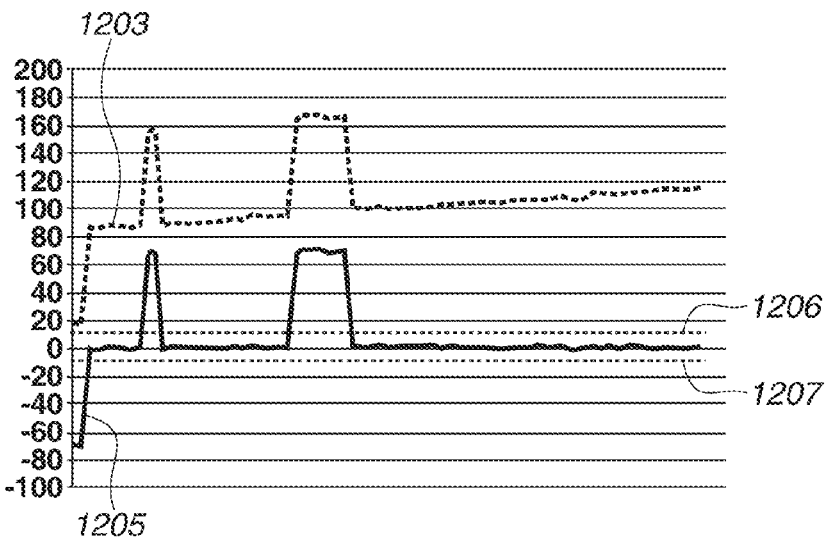

With reference to FIGS. 12A to 12C, description will be given to an exemplary embodiment for determining whether difference data is valid. FIG. 12A is a diagram illustrating a state where a streak is generated at a starting position of the target position in an area 405. Unlike the state illustrated in FIG. 8A, a streak 1201 is generated at the starting position.

FIGS. 12B and 12C are graphs illustrating a line signal value 1203 acquired with respect to the area 405. A signal value is low at the left end because a dark streak is generated. An average value difference data 1204 illustrated in FIG. 12B is acquired when the average difference data 613 is calculated with respect to the line signal value 1203 in accordance with the main scanning direction 801. Because a portion where the streak is generated is assigned as a starting point of the target position, the portion where the streak is generated is determined to be normal. The data of the portion posterior to that portion including the portion where a streak is not generated is detected as the streak, and thus difference value is greater. When the streak determination processing is executed using an upper limit threshold value 1206 and a lower limit threshold value 1207, the entire region excluding the streak 1201 is erroneously determined as streaks.

Thus, the analysis processing is executed on the difference data in step S1102 in order to prevent the erroneous determination from occurring. In the analysis processing in step S1102, the CPU 103 executes threshold determination processing on the average value difference data 1204 and counts the number of difference values that exceed the threshold value. The CPU 103 uses difference data validity determination information 1103 and determines that the difference data is not valid if there are too many difference values that exceed the threshold value (i.e., if the number of difference values that exceed the threshold value is equal to or greater than a certain number). The average value difference data 1204 is determined to be invalid because most of the difference values thereof exceed the upper limit threshold value 1206.

FIG. 12C is a graph illustrating average value difference data 1205 acquired by resetting the target position and the scanning method in step S1105. The average value difference data 1205 is acquired in such a manner that a right end portion is assigned as a starting position of the target position and differences are calculated according to a scanning direction 1202 of FIG. 12A. Because a streak is not generated at the starting position of the target position, the streak can be detected through the streak determination processing using the upper limit threshold value 1206 and the lower limit threshold value 1207.

In the present exemplary embodiment, a method in which scanning is started from the right end in the opposite direction has been described as an example of the target position/scanning method setting information. Alternatively, a method in which scanning is started toward the right and left ends by setting the starting position of the target position at the center can be employed. Further, in the present exemplary embodiment, difference data has been analyzed through a method using the number of average value difference data that exceed the threshold value. Alternatively, any analysis method other than the above can be used. For example, whether the detected streak is really a streak can be determined by calculating the average/dispersion of signal values of the detected streak.

According to the present exemplary embodiment, it is possible to detect presence or absence of the streak as well as the position and the width of the streak without influence of in-plane deviation which is the printer-specific feature amount and influence of in-plane deviation/noise which is the scanner-specific feature amount. Further, because the streak is detected for each of the colors of C, M, Y, and K, a faulty portion can be estimated more specifically.

Further, according to the present exemplary embodiment, it is possible to determine whether a result of streak detection processing is valid by analyzing the average value difference data, detection accuracy can be therefore improved.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that the aspects of the invention are not limited to the disclosed exemplary embodiments. The scope of the following claims is to be accorded the broadest interpretation so as to encompass all such modifications and equivalent structures and functions.

This application claims the benefit of Japanese Patent Application No. 2015-161992, filed Aug. 19, 2015, which is hereby incorporated by reference herein in its entirety.

What is claimed is:

1. An image processing apparatus comprising:
   an acquisition unit configured to acquire, from image data acquired in such a manner that a chart formed by an image forming unit is read, a line signal value from pixel values of pixels for a line arranged in a first direction of the chart and a line representative value by using line signal values respectively acquired from a plurality of lines adjacent to each other in a second direction different from the first direction of the chart; and
   a determination unit configured to determine whether a streak is generated in a first position by using a difference between a first representative value and a second representative value, the first representative value being acquired by the acquisition unit at a second position that is read prior to the first position in the second direction and the second representative value being acquired by the acquisition unit at a third position that is read posterior to the first position in the second direction,
   wherein the second position is a position where the determination unit does not determine that a streak is generated.

2. The image processing apparatus according to claim 1, wherein the acquired line signal value is an average value of pixel values of a plurality of pixels arranged in the first direction of the chart.

3. The image processing apparatus according to claim 1, wherein the first representative value is acquired by calculating an average value of line representative values of lines each corresponding to a position that is scanned prior to the first position and is within a predetermined range in the second direction.

4. The image processing apparatus according to claim 1, wherein the second representative value is acquired by calculating an average value of line representative values of lines corresponding to a position that is scanned posterior to the first position and is within a predetermined range in the second direction.

5. The image processing apparatus according to claim 1, wherein the determination unit determines that a streak is generated at the first position when a difference between the first representative value and the second representative value is greater than a first threshold value.

6. The image processing apparatus according to claim 1, wherein the chart includes regions formed of toners of cyan (C), magenta (M), yellow (Y), and black (K), respectively.

7. The image processing apparatus according to claim 1, wherein an estimation of which part in the image processing apparatus is faulty is performed using a result of determination executed by the determination unit.

8. The image processing apparatus according to claim 1, wherein, among the differences between first representative values and second representative values, in a case where a number of differences having values greater than a first threshold value is greater than a second threshold value, the determination unit changes the first position, executes scanning in a direction opposite to the scanning direction, and acquires the first representative values and the second representative values.

9. The image processing apparatus according to claim 1, wherein the image forming unit is instructed to form a chart with uniform density.

10. An image processing method comprising:
    acquiring, from image data acquired in such a manner that a chart formed by an image forming unit is read, a line signal value from pixel values of pixels for a line arranged in a first direction of the chart and a line representative value by using line signal values respectively acquired from a plurality of lines adjacent to each other in a second direction different from the first direction of the chart; and
    determining whether a streak is generated in a first position by using a difference between a first representative value and a second representative value, the first representative value being acquired at a second position that is read prior to the first position in the second direction and the second representative value being acquired by the acquiring at a third position that is read posterior to the first position in the second direction,
    wherein the second position is a position where it is not determined that the streak is generated.

11. A non-transitory computer-readable storage medium storing computer-executable instructions that cause a computer to execute a control method, the control method comprising:
    acquiring, from image data acquired in such a manner that a chart formed by an image forming unit is read, a line signal value from pixel values of pixels for a line arranged in a first direction of the chart and a line representative value by using line signal values respectively acquired from a plurality of lines adjacent to each other in a second direction different from the first direction of the chart; and
    determining whether a streak is generated in a first position by using a difference between a first representative value and a second representative value, the first representative value being acquired at a second position that is read prior to the first position in the second direction and the second representative value being acquired at a third position that is read posterior to the first position in the second direction,
    wherein the second position is a position where it is not determined that the streak is generated.

* * * * *